Feb. 13, 1945.    D. I. WILSON    2,369,330
LIVE COLLET FOR SCREW MACHINES
Filed July 20, 1942    2 Sheets-Sheet 1

INVENTOR
DELBERT I. WILSON,
BY
Toulmin & Toulmin,
ATTORNEYS

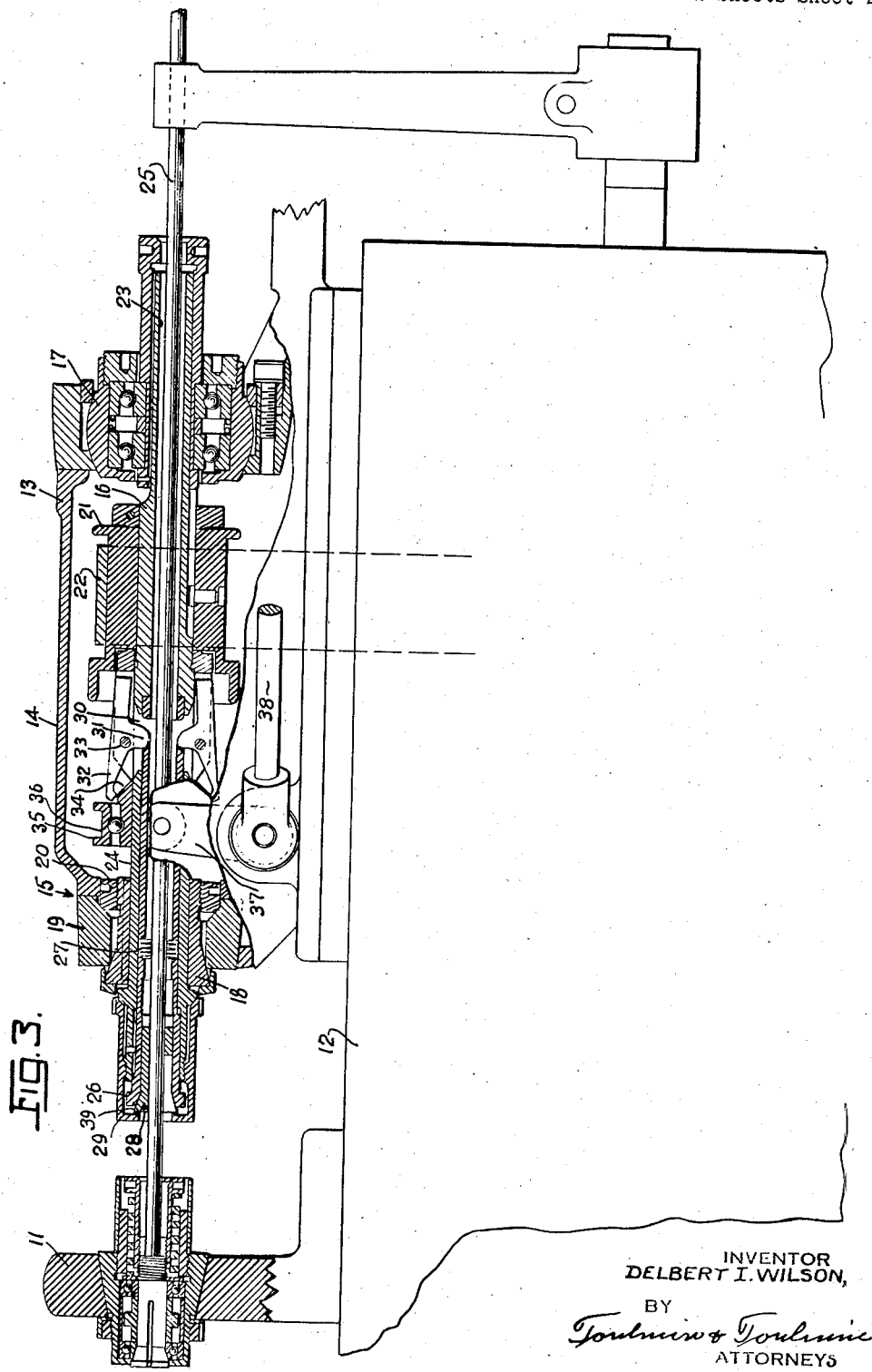

Patented Feb. 13, 1945

2,369,330

UNITED STATES PATENT OFFICE 2,369,330

LIVE COLLET FOR SCREW MACHINES

Delbert I. Wilson, Dayton, Ohio, assignor to The City Engineering Company, Dayton, Ohio, a corporation of Ohio Application July 20, 1942, Serial No. 451,568

2 Claims. (Cl. 82—38)

This invention relates to an apparatus for supporting workstock in a turning machine that extends beyond the workstock driving spindle to maintain the same on a true center for accurate turning operations.

When turning workstock upon a lathe or other turning machine, such as screw machines, it is desirable to support the workstock adjacent the turning tools so that the concentricity of the turned piece is accurately maintained. This has been accomplished in the past by conventional steady rests or center rests that utilize a plurality of arms disposed radially about the workstock and in engagement therewith to support the same. Some rests have even included bearing members for supporting the workstock.

An object of this invention is to provide a steady rest or center rest or bushing support for the workstock that rotates with the workstock, and by means of the workstock to prevent scoring of the stock upon the supporting member.

It is another object of the invention to provide a workstock guide bushing support for a turning machine that is provided with a rotatable member adapted to frictionally engage the workstock and to be driven thereby.

It is another object of the invention to provide a workstock guide bushing support in accordance with the foregoing object wherein the degree of frictional engagement of the bushing support with the workstock can be changed.

It is another object of the invention to provide a steady rest or center rest having means frictionally engaging the workstock passing therethrough for rotation therewith, and which is adapted to release the workstock when it is being fed forwardly through the center rest or steady rest.

It is another object of the invention to provide a workstock guide bushing support for a screw machine that rotates with the workstock and which permits the workstock to be advanced through the same.

Another object of the invention is to provide a live collet in a steady rest or guide support for the workstock that will support the stock and rotate with the same to prevent damage to the stock during the turning operation.

It is another object of the invention to provide a live collet for the workstock guide bushing on a screw machine.

It is another object of the invention to provide a steady rest or workstock guide bushing that is adapted to receive collets having different internal diameters that is constructed and arranged in a manner that the collets will rotate with the workstock and thereby prevent a rotating frictional engagement between the workstock and the support member for the same.

Further objects and advantages will become apparent from the drawings and the following description.

In the drawings:

Fig. 3 is a longitudinal cross-sectionl view through the spindle of the screw machine of Fig. 1 and through the workstock guide bushing support.

Figure 1:
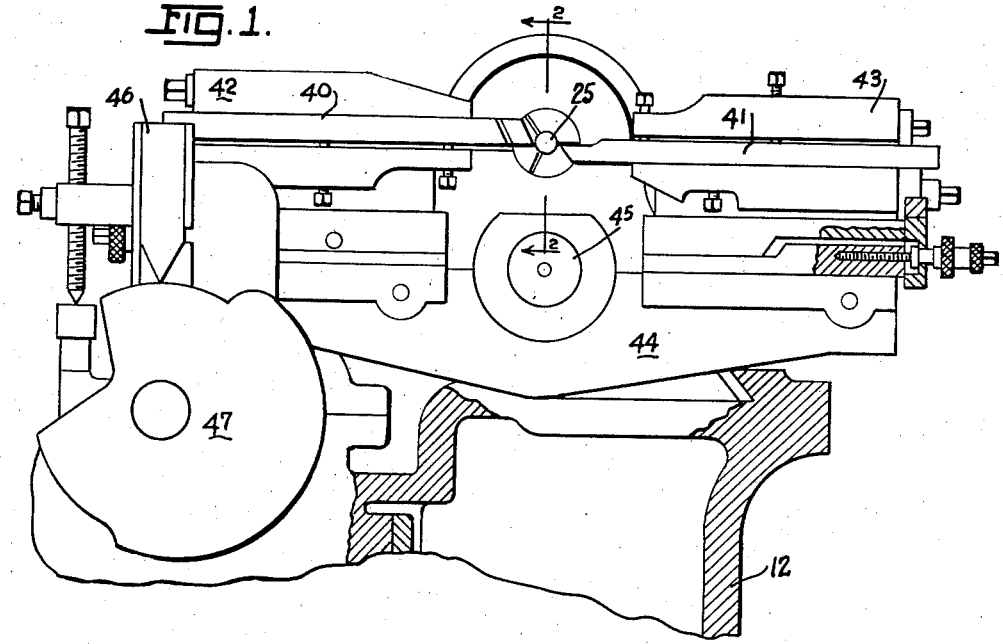
Fig. 1 is an end elevational view of a screw machine upon which the device of this invention has been placed.

This invention relates to a device for supporting workstock that extends from a spindle of a turning machine co-axially with the spindle of the turning machine. When turning long relatively thin articles it is desirable to support the stock immediately adjacent the turning tool to prevent the stock from flexing and thus change the concentricity of the turned portion. Also, it may be desirable to support a long article regardless of the position of the support with respect to the work tools so that the article will not sag and thus effect the concentricity of the turned article. Again, it may be desirable to feed the workstock through a support member and yet maintain the support member in a close fitting relationship upon the surface of the workstock.

The conventional steady rest or center rest consists of a member that is provided with a plurality of radially positioned arms extending toward the axis of the member so that they can be adjusted into engagement with the workstock and thus support the same. However, many metals are damaged when engaged with the conventional type of steady rests due either to a scoring or a burnishing of the surface of the workstock at the point of engagement with the steady rest. This effect becomes more noticeable as the speed of rotation of the workstock increases, and is particularly noticeable on materials such as stainless steel or Monel.

This invention, therefore, provides a live collet for use in a steady rest that is driven by the workstock and is suitably bearinged in the steady rest to guide the workstock. Thus, the surface of the workstock remains undamaged because there is no relative rotary surface movement between the surface of the supporting member and the workstock.

As disclosed in this invention the live steady rest is shown as used upon a screw machine wherein the workstock is fed through the live steady rest for the turning operation, the spindle of the screw machine driving the workstock while the workstock drives the live steady rest.

The workstock guide support 10 of this invention is shown as being supported by a guide bushing support member 11 that is secured to the base 12 of the screw machine 15.

The base 12 of the screw machine 15 carries a spindle 13 that consists of a spindle housing 14 secured to the base 12. A drive shaft 16 extends longitudinally within the spindle housing 14 and is bearinged at one end by means of a ball thrust bearing 17 that is preloaded to control the thrust of the shaft 16. The shaft 16 is bearinged at the opposite end within a sleeve bearing 18 that engages a boss 19 carried by the spindle housing 14 and secured thereto by means of a nut 20. The shaft 16 carries a pulley 21 that is secured thereon over which a belt 22 extends and is connected to a suitable source of power.

The drive shaft 16 has a longitudinal bore 23 through which the workstock 25 extends, the forward end of the drive shaft 16 receiving the sleeves 24 and 26 that are spaced from one another by means of the spring 27. The sleeve 26 receives a collet 28 adapted to frictionally engage the workstock 25 for rotating the same. The collet 28 is retained upon the drive shaft 16 by means of a retaining nut 29.

The sleeves 24 and 26 are slidable within the drive shaft 16. The sleeve 24 is provided with slots 30 therein that receive ears 31 for engaging the sleeve 24. The ears 31 are carried by levers 32 pivoted upon the pins 33, the forward ends of the levers 32 resting upon the angular surface 34 of the shift collar 35. The shift collar 35 provides the inner race of a ball bearing, the outer race 36 of which is engaged by a yoke 37 actuated by a handle 38 positioned exteriorly of the spindle housing 14. Therefore, the movement of the handle 38 will cause movement of the sleeve 24 to move the sleeve 26 and close upon the tapered head 38 of the collet 28 to engage the workstock and thereby drive the same.

The turning tools 40 and 41 of the screw machine are carried within the tool supports 42 and 43, respectively, that are secured to opposite ends of a lever 44 pivoted upon the pin 45, whereby the turning tools 40 and 41 are moved radially into the workstock 25 for turning the same to any predetermined diameter. The lever 44 carries a cam follower 46 that engages a cam 47 driven from the source of power upon the screw machine.

The spindle 13 of the screw machine is adapted to move forwardly with respect to the turning tools 40 and 41 to regulate longitudinal turning upon the workstock 25.

It will be readily seen from the foregoing description that the workstock 25 will rotate within the guide bushing support member 11, and within any suitable guide bushing support device that is carried in the guide bushing support 11. It will also be noted that the workstock not only rotates in the guide bushing support member but that it moves longitudinally therein so that there is considerable frictional engagement between the workstock and any workstock support device that is held within the guide bushing support member 11 in order to prevent its rotation with the workstock 25.

The workstock guide support 10 of this invention however is constructed and arranged in a manner that a part of the device rotates with the workstock, and specifically a collet that supports the workstock so that there is no frictional surface engagement of the workstock with the guide bushing support 10 as far as rotation is concerned. The workstock guide bushing support 10 consists of a body 50 that is provided with a tapered cylindrical surface 51 adapted to fit within a corresponding tapered opening 52 provided in the workstock guide support member 11. A nut 53 is threaded upon the threaded portion 54 of the body 50 to retain the same solidly in position in the tapered opening 52, a suitable lock washer 55 being provided to prevent loosening of the nut 53.

The body 50 is provided with an internal bore 56 that provides a flange 57 at the forward end thereof. A ball bearing 58 is placed within the bore 56 in engagement with the flange 57 and a second ball bearing 59 is placed in the rearward portion of the bore 56, the ball bearings 56 and 59 being spaced from one another by means of the annular rings 60 and 61. A cylindrical body 62 is threaded into the rearward portion of the body 50 in engagement with the threads 63 so that the forward end 64 of the member 62 engages the rear ball bearing 59 to urge the bearing 59 and the rings 60 and 61 forwardly against the bearing 56 to retain the assembly in proper assembled relationship.

A collet having a tapered head 66 is placed within the ball bearings 58 and 59, and is bearinged thereby. The inner race 67 of the ball bearing 56 is provided with a tapered surface 68 that engages the tapered head 66 on the collet 65.

Figure 2:
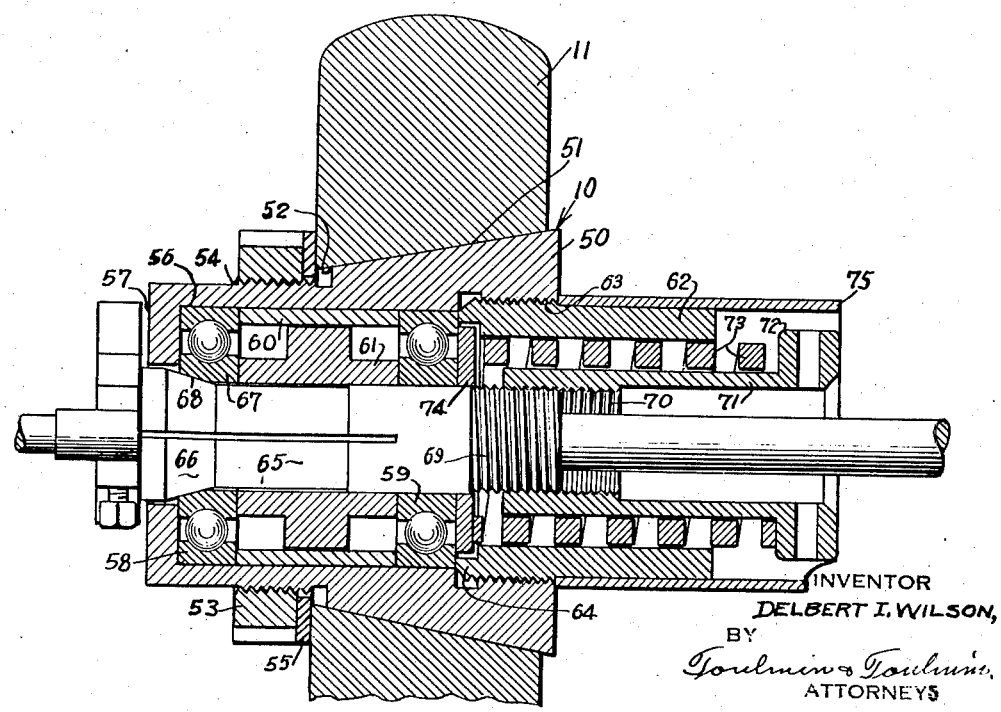
Fig. 2 is a vertical cross-sectional view of the workstock guide bushing support of the screw machine of Fig. 1, incorporating the device of this invention, and is taken along line 2—2 of Fig. 1.

The rear end of the collet 65 is provided with a threaded portion 69 that is engaged by the threaded portion 70 of a sleeve 71 that has a radial flange 72 extending therefrom. A spring 73 is placed between the flange 72 on the sleeve 71 and a washer 74 positioned against the ball bearing 59 so that when the sleeve 71 is threaded upon the collet 65 the spring 73 will urge the collet in a rightward direction as viewed in Fig. 2, to close the head of the collet upon the workstock 25 extending therethrough. The degree of frictional engagement of the head 66 of the collet 65 with the workstock 25 is regulated by the compression of the spring 73. The spring 73 is compressed so that the collet 65 engages the workstock 25 with sufficient friction that it is driven by the workstock 25, but the workstock can be moved axially within the collet 65 for movement past the turning tools 40 and 41 to produce longitudinal turning cuts upon the workstock.

From the foregoing description it will be readily apparent that the workstock 25 is driven by the spindle 13, and since the collet 65 is driven by the workstock 25, there will be no rotating frictional engagement of the surface of the workstock within a stationary element in the machine except the turning tools. Therefore, the support member, in this instance, the collet 65, for the workstock 25 can be made a very close fit upon the workstock and thereby eliminate chatter of the stock without damaging the workstock due to scoring of the same caused by the stock running within a stationary bearing member.

A sleeve 75 is placed upon the body 62 and extends rearwardly beyond the flange 72 on the sleeve 71. The sleeve 75 prevents the flange 72 or the spring 73 from throwing oil away from the guide support 10. It will be readily appreciated that the workstock 25 is well lubricated by a continuous flow of oil and that oil will accumulate upon the workstock guide support, and that the oil will be thrown away from the rotating parts on to the operator of the machine if a suitable shield was not provided. The head 66 of the collet 65 is also shielded to prevent the same from throwing oil. The flange 57 on the forward end of the body 50 is sufficiently wide to substantially enclose the head 66 of the collet 65, and since the flange 57 is a stationary member the oil thrown from the head 66 of the collet 65 will be prevented from being thrown away from the guide bushing 10. The collet 65 is interchangeable with other collets having different internal diameters to receive workstock of different external diameters.

The workstock guide support 10 has been illustrated in this invention as being used upon a screw machine for supporting the workstock immediately adjacent the turning tools, the workstock being fed through the guide support for movement past the turning tools.

It will be readily apparent, however, that the device can be used on any turning machine such as lathes and the like, and that it can be positioned at any point along the length of the workstock that overhangs the spindle for driving the workstock, and that it could also be mounted upon the carriage of a turning machine so that it will follow the movement of the carriage and thus provide a follower rest for turning long lengths of stock.

While the form of the device disclosed and described in this application is a preferred form of the device, yet it is to be understood that it is capable of considerable mechanical alteration and that all such modified arrangements as fall within the scope of the appended claims are intended to be included herein.

Having thus fully described my invention, what I claim as new and desire to secure by Letters Patent is:

1. A steady rest for a machine tool adapted to support work stock extending beyond the power driven spindle of the machine tool which consists of, a supporting body member adapted to be secured to a machine tool having an axial chamber therein and a shoulder extending inwardly toward the axis of the chamber on one end of said body, an anti-friction bearing member disposed in said chamber against said shoulder and having an inner race provided with a cone shaped inner surface, a second anti-friction bearing member positioned in said chamber and having an inner race provided with a cylindrical inner surface, a work stock supporting collet having a cone shaped head thereon engaging said cone shaped surface on said first bearing and a cylindrical surface engaging the cylindrical surface of the second bearing whereby to support said collet by the said bearings, a spacing means for locating said bearing members in said chamber, a sleeve secured to said collet, and spring means between the said sleeve and said last mentioned bearing for forcibly retaining the tapered head of said collet in engagement with said first bearing.

2. A steady rest for a machine tool adapted to support work stock extending beyond the power driven spindle of the machine tool which consists of, a supporting body member adapted to be secured to a machine tool having an axial chamber therein and shoulder extending inwardly toward the axis of the chamber on one end of said body, an anti-friction bearing member disposed in said chamber against said shoulder and having an inner race provided with a cone shaped inner surface, a second anti-friction bearing member positioned in said chamber and having an inner race provided with a cylindrical inner surface, a work stock supporting collet having a cone shaped head thereon engaging said cone shaped surface on said first bearing and a cylindrical surface engaging the cylindrical surface of the second bearing whereby to support said collet by the said bearings, a spacing means for locating said bearing members in said chamber, a sleeve secured to said collet, spring means between the said sleeve and said last mentioned bearing for forcibly retaining the tapered head of said collet in engagement with said first bearing, and means in engagement with said body surrounding said spring and in engagement with said second bearing to secure said bearing members said collet and said spring carried thereby in said body.

DELBERT I. WILSON.